US011345858B2

(12) United States Patent
Ni et al.

(10) Patent No.: US 11,345,858 B2
(45) Date of Patent: May 31, 2022

(54) COMPOSITION AND FLAME-RETARDANT RESIN COMPOSITION

(71) Applicant: ADEKA CORPORATION, Tokyo (JP)

(72) Inventors: Yang Ni, Saitama (JP); Yohei Inagaki, Saitama (JP); Yutaka Yonezawa, Saitama (JP); Naoko Tanji, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 159 days.

(21) Appl. No.: 16/629,134

(22) PCT Filed: Jun. 14, 2018

(86) PCT No.: PCT/JP2018/022813
§ 371 (c)(1),
(2) Date: Jan. 7, 2020

(87) PCT Pub. No.: WO2019/021671
PCT Pub. Date: Jan. 31, 2019

(65) Prior Publication Data
US 2020/0148954 A1    May 14, 2020

(30) Foreign Application Priority Data
Jul. 24, 2017    (JP) .............................. JP2017-143108

(51) Int. Cl.
| C09K 21/12 | (2006.01) |
| C08K 3/22 | (2006.01) |
| C08K 5/3462 | (2006.01) |
| C08K 5/529 | (2006.01) |
| C08K 13/02 | (2006.01) |
| C09K 21/02 | (2006.01) |
| C09K 21/10 | (2006.01) |

(52) U.S. Cl.
CPC ................ *C09K 21/12* (2013.01); *C08K 3/22* (2013.01); *C08K 5/3462* (2013.01); *C08K 5/529* (2013.01); *C08K 13/02* (2013.01); *C09K 21/02* (2013.01); *C09K 21/10* (2013.01); *C08K 2003/2296* (2013.01); *C08K 2201/014* (2013.01)

(58) Field of Classification Search
None
See application file for complete search history.

(56) References Cited

U.S. PATENT DOCUMENTS

| 4,329,381 A | 5/1982 | Eschwey et al. |
| 4,507,270 A | 3/1985 | Harth et al. |
| 5,147,912 A * | 9/1992 | Moore ...................... B29B 9/10 |
| | | 524/101 |
| 9,023,469 B2 | 5/2015 | Oota et al. |
| 2003/0073763 A1 | 4/2003 | Govaerts et al. |
| 2010/0298474 A1 | 11/2010 | Futterer et al. |
| 2011/0162353 A1 | 7/2011 | Vanvolsem et al. |
| 2012/0329920 A1* | 12/2012 | Sato ................... C08K 5/34928 |
| | | 524/100 |
| 2014/0200292 A1 | 7/2014 | Okita et al. |
| 2015/0337204 A1 | 11/2015 | Yamazaki et al. |
| 2016/0006585 A1 | 1/2016 | Baptiste et al. |
| 2016/0052927 A1 | 2/2016 | Pfaendner et al. |
| 2017/0342239 A1 | 11/2017 | Ni et al. |

FOREIGN PATENT DOCUMENTS

| CN | 1282696 C | 11/2006 |
| CN | 101765629 A | 6/2010 |
| CN | 103562349 A | 2/2014 |
| CN | 104870613 A | 8/2015 |
| CN | 105102522 A | 11/2015 |
| EP | 0 389 768 A2 | 10/1990 |
| EP | 2716734 A1 | 4/2014 |
| EP | 3 255 100 A1 | 12/2017 |
| EP | 3431550 A1 | 1/2019 |
| EP | 3492557 A1 | 6/2019 |
| JP | S54-123145 A | 9/1979 |
| JP | S59-031779 A | 2/1984 |
| JP | 2000-290479 A | 10/2000 |
| JP | 2002-128969 A | 5/2002 |
| JP | 2004-174959 A | 6/2004 |
| JP | 2010-209239 A | 9/2010 |
| JP | 2011-148936 A | 8/2011 |
| JP | 2012-236867 A | 12/2012 |

(Continued)

OTHER PUBLICATIONS

International Search Report, dated Jul. 10, 2018, from corresponding PCT application No. PCT/JP2018/022813.

(Continued)

*Primary Examiner* — Robert T Butcher
(74) *Attorney, Agent, or Firm* — Nixon & Vanderhye

(57) ABSTRACT

A composition includes first, second, and third components. The composition preferably includes 0.1 to 50 parts by mass of the third component with respect to 100 parts by mass in total of the first and second components. The first component is at least one type of melamine salt selected from the group consisting of melamine orthophosphate, melamine pyrophosphate, and melamine polyphosphate. The second component is at least one type of piperazine salt selected from the group consisting of piperazine orthophosphate, piperazine pyrophosphate, and piperazine polyphosphate. The third component is cyanuric acid or zinc cyanurate.

19 Claims, No Drawings

(56) References Cited

FOREIGN PATENT DOCUMENTS

| | | |
|---|---|---|
| JP | 2015-117245 A | 6/2015 |
| JP | 2016-125035 A | 7/2016 |
| JP | 2017-008221 A | 1/2017 |
| JP | 2017-095648 A | 6/2017 |
| KR | 10-2006-0065057 A | 6/2006 |
| KR | 20140028018 A | 3/2014 |
| TW | 201249971 A | 12/2012 |
| TW | 201420733 A | 6/2014 |
| WO | 2014/080821 A1 | 5/2014 |
| WO | 2012/161070 A1 | 7/2014 |
| WO | 2017/159161 A1 | 1/2019 |
| WO | 2018/020840 A1 | 5/2019 |

OTHER PUBLICATIONS

Xiao et al., "Thermal properties and combustion behaviors of flame-retarded glass fiber-reinforced polyamide 6 with piperazine pyrophosphate and aluminum hypophosphite," Journal of Thermal Analysis and Calorimetry, 2016, vol. 125, pp. 175-185.

\* cited by examiner

COMPOSITION AND FLAME-RETARDANT RESIN COMPOSITION

TECHNICAL FIELD

The present invention relates to a composition including a phosphate of piperazine and a phosphate of melamine, and a flame-retardant resin composition including the composition.

BACKGROUND ART

Synthetic resins have conventionally been widely used, for example, for construction materials, automobile parts, packaging materials, agricultural materials, housing materials for home appliances, and toys because of their excellent chemical and mechanical characteristics. Unfortunately, many synthetic resins are flammable and thus need flame-proofing for some applications. A widely known flame-proofing method is to use one or a combination of flame retardants, such as halogen-based flame retardants, inorganic phosphorus-based flame retardants typified by red phosphorus and polyphosphate-based flame retardants such as ammonium polyphosphate, organophosphorus-based flame retardants typified by triaryl phosphate ester compounds, metal hydroxides, and antimony oxide and melamine compounds which are flame-retardant assistants.

Known phosphorus-based flame retardants include intumescent flame retardants that include a salt between polyphosphoric acid or pyrophosphoric acid and a nitrogen-containing compound as a main component and that form a surface-swelling (intumescent) layer on combustion, thus achieving flame retardancy by preventing the diffusion of decomposition products and the transfer of heat. For example, Patent Literature 1 discloses such a flame retardant.

Patent Literature 2 proposes a flame-retardant resin composition including: ammonium polyphosphate; an amine salt produced by a reaction between an amine compound and at least one type of acid selected from phosphoric acid, pyrophosphoric acid, condensed phosphoric acid, and cyanuric acid; a reaction product of tris(2-hydroxyethyl) isocyanurate and an isocyanate compound; a metal compound; and isocyanuric acid. The document describes that the inclusion of isocyanuric acid in the flame-retardant resin composition can improve drip-preventing effects in the UL-94 vertical burning test.

CITATION LIST

Patent Literature

Patent Literature 1: US 2014/0200292 A1
Patent Literature 2: JP 2002-128969 A

SUMMARY OF INVENTION

There are increasing demands for fire-prevention properties in various applications employing resin materials. This, in turn, calls for increasingly higher levels of flame retardancy performance required of resin compositions. For example, there are strong demands for heat-release suppressing effects in evaluations according to the heat-release cone calorimeter method, in addition to drip-preventing effects in the UL-94 vertical burning test.

The aforementioned conventional flame retardants, however, are insufficient in terms of achieving both drip-preventing effects and heat-release suppressing effects.

An objective of the present invention is to provide a composition capable of imparting drip-preventing effects and heat-release suppressing effects by being mixed with a resin and capable of imparting excellent flame retardancy to the resin, and a flame-retardant resin composition including the aforementioned composition and a resin and achieving excellent flame retardancy.

As a result of diligent research to solve the aforementioned problems, Inventors have found that, surprisingly, not only drip-preventing effects but also excellent heat-release suppressing effects can be obtained by mixing a resin with a composition obtained by blending cyanuric acid or a zinc salt of cyanuric acid to a combination of phosphates of two specific types of amines.

The present invention is based on the aforementioned finding, and provides a composition including component (A) described below, component (B) described below, and component (C) described below: component (A): at least one type of melamine salt selected from the group consisting of melamine orthophosphate, melamine pyrophosphate, and melamine polyphosphate; component (B): at least one type of piperazine salt selected from the group consisting of piperazine orthophosphate, piperazine pyrophosphate, and piperazine polyphosphate; and component (C): cyanuric acid or zinc cyanurate.

The present invention also provides a flame-retardant resin composition including a resin and the aforementioned composition, and a shaped product thereof.

The present invention also provides a method for flame-proofing a resin, involving mixing the resin with a composition including the aforementioned component (A), component (B), and component (C).

The present invention also provides a use, as a flame retardant, of a composition including the aforementioned component (A), component (B), and component (C).

DESCRIPTION OF EMBODIMENTS

The invention is described in detail below according to preferred embodiments.

In the following description, "flame retardancy/flame-retardant" means that a substance is unlikely to ignite, or, even if it ignites and keeps burning, the burning speed is very slow or the substance self-extinguishes after igniting. Preferably, "flame retardancy/flame-retardant" means that the substance is at least ranked V-2, more preferably ranked V-1 or V-0, among the combustion ranks according to the UL-94V standard described in the Examples further below. A "flame retardant composition" refers to a composition including at least one type of flame retardant. A "flame-retardant resin composition" refers to a composition that has the aforementioned flame retardancy and that includes at least one type of a synthetic resin.

A feature of a composition according to the present invention is that it includes all of the aforementioned component (A), component (B), and component (C).

A melamine salt used as component (A) is selected from the group consisting of melamine orthophosphate, melamine pyrophosphate, and melamine polyphosphate. There are cases where only one type of the melamine salt is used, and there are cases where two or more types are used as a mixture. Among the above, melamine pyrophosphate is preferably used from the viewpoint of flame retardancy, handleability, and storage stability. In cases of using the melamine salts as a mixture, it is preferable that the content by percentage, in terms of mass, of melamine pyrophosphate is the highest in the mixture. Polyphosphoric acids are so-called condensed phosphoric acids, and examples include open-chain polyphosphoric acids and cyclic polymetaphosphoric acids. The condensation degree of polyphosphoric acid is 3 or greater.

The aforementioned salts of the phosphoric acids and melamine can be obtained by reacting melamine with the corresponding phosphoric acid or phosphate. Particularly, the melamine salt used as component (A) in the present invention is preferably melamine pyrophosphate or melamine polyphosphate obtained by subjecting melamine orthophosphate to heating and condensation, with melamine pyrophosphate being particularly preferable.

The piperazine salt used as component (B) in the composition of the present invention is selected from the group consisting of piperazine orthophosphate, piperazine pyrophosphate, and piperazine polyphosphate. There are cases where only one type of the piperazine salt is used, and there are cases where two or more types are used as a mixture. Among the above, piperazine pyrophosphate is preferably used from the viewpoint of flame retardancy, handleability, and storage stability. In cases of using the piperazine salts as a mixture, it is preferable that the content by percentage, in terms of mass, of piperazine pyrophosphate is the highest in the mixture.

The aforementioned salts of the phosphoric acids and piperazine can be obtained by reacting piperazine with the corresponding phosphoric acid or phosphate. Particularly, the piperazine salt used as component (B) in the present invention is preferably piperazine pyrophosphate or piperazine polyphosphate obtained by subjecting piperazine orthophosphate to heating and condensation, with piperazine pyrophosphate being particularly preferable.

The contents of component (A) and component (B) in the composition of the present invention when the total amount of component (A) and component (B) is 100 parts by mass are preferably 10 to 50 parts by mass of component (A) and 90 to 50 parts by mass of component (B), and more preferably, 20 to 40 parts by mass of component (A) and 80 to 60 parts by mass of component (B). Setting the contents of component (A) and component (B) within the aforementioned ranges is preferable because this improves self-extinguishing and gas-barrier properties of intumescents formed during combustion in cases where these components are used in combination with the later-described component (C).

Further, in the composition of the present invention, it is preferable that the total amount of the component (A) and component (B) is 70 to 99.9 mass %, more preferably 80 to 99 mass %. Setting the total amount of the component (A) and component (B) to 70 mass % or greater is preferable in terms of improving the effect of imparting flame retardancy, and setting the total amount to 99.9 mass % or less is preferable in terms of ensuring sufficient amounts of the component (C) and other optional components and thereby improving the effects of the present invention.

Next, component (C) of the composition of the present invention is described.

Component (C) in the composition of the present invention is cyanuric acid or zinc cyanurate.

Conventionally, acid components, such as cyanuric acid, have almost never been used individually as an acid, because acids, when added directly to a resin, degrade the resin during processing. Inventors have found that, when cyanuric acid is used in combination with the aforementioned component (A) and component (B), not only can drip-preventing effects be obtained but also excellent heat-release suppressing effects can be obtained, and have also found that, when zinc cyanurate is used instead of cyanuric acid, effects equivalent to or better than those of cyanuric acid can be obtained. The reason behind this is not clear, but Inventors believe that the use of cyanuric acid or zinc cyanurate in combination with the component (A) and component (B) increases the melting speed during combustion of resin, which thereby promotes the action of forming an intumescent by the combination of component (A) and component (B). Inventors therefore presume that the use of the composition of the present invention accelerates the development of flame retardancy in resins, and thus combustion preventing/suppressing effects are achieved.

Cyanuric acid alone or zinc cyanurate alone may be used as the component (C), or both can be used as a mixture.

Known forms of cyanuric acid generally include the enol-form triazine-2,4,6-triol (the compound in the following formula (1)) and the keto-form triazine-2,4,6-trione (the compound in the following formula (2); also referred to as isocyanuric acid). Both are tautomers, and therefore, in the present invention, it is possible to use not only the enol-form triazine-2,4,6-triol but also the keto-form triazine-2,4,6-trione as the cyanuric acid.

[Chem. 1]

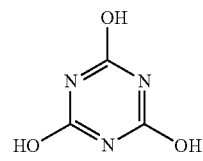

(1)

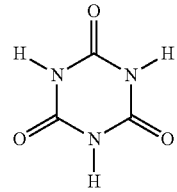

(2)

Examples of zinc cyanurate include compounds with a structure in which cyanuric acid coordinates to zinc, and compounds disclosed, for example, in JP S54-123145 A, JP S59-31779 A, PCT Application Domestic Re-publication No. 2011/162353, PCT Application Domestic Re-publication No. 2016/006585, JP 2012-236867 A, and JP 2015-117245 A can be used without particular limitation.

Zinc cyanurate is ordinarily used as a powder. Particularly, powder having an average particle size $D_{50}$ of from 0.1 to 50 μm as measured by laser diffractometry is preferable, from the viewpoint of handleability, dispersibility to resin, and easy development of flame retardancy. From this viewpoint, the aforementioned average particle size $D_{50}$ of zinc cyanurate is more preferably from 0.5 to 5 μm. Further, it is preferable that the zinc cyanurate has a shape that is long in one direction, such as a needle-shape or rod-shape, when observed with a transmission electron microscope, from the viewpoint that the effect of imparting flame retardancy is greater. For example, it is preferable that the ratio of the major axis length to the minor axis length when observed with a transmission electron microscope is preferably 4 or greater, more preferably 8 or greater, from the viewpoint of imparting flame retardancy and preventing dripping. As regards the ratio of the major axis length to the minor axis length, it is sufficient if the ratio of at least one particle is equal to or greater than the aforementioned lower limit when the particles are observed, for example, at a magnification of 30,000× to 200,000× with a transmission electron microscope, and it is more preferable that a mean value of ten or more particles is equal to or greater than the aforementioned lower limit.

In the composition of the present invention, the content of the component (C) is preferably 0.1 to 50 parts by mass with respect to 100 parts by mass in total of the component (A) and the component (B), and preferably 0.5 to 40 parts by mass, more preferably 1 to 20 parts by mass, even more preferably 3 to 10 parts by mass, from the viewpoint of flame retardancy and processability. Setting the content of the component (C) to 0.1 parts by mass or greater is advantageous in terms of preventing dripping and forming an intumescent. Setting the content of the component (C) to 50 parts by mass or less is advantageous from the viewpoint of economy and crisis contamination during processing.

The composition of the present invention may further include zinc oxide (ZnO). (This component is referred to hereinafter also as "component (D)".)

The zinc oxide functions as a flame-retardant assistant. The zinc oxide may be surface-treated. Commercially-available products of zinc oxide may be used, and examples include Zinc Oxide Type 1 (manufactured by Mitsui Mining and Smelting Co., Ltd.), partially-coated zinc oxide (manufactured by Mitsui Mining and Smelting Co., Ltd.), Nanofine 50 (ultrafine zinc oxide particles; average particle size: 0.02 μm; manufactured by Sakai Chemical Industry Co., Ltd.), and Nanofine K (ultrafine zinc oxide particles coated with zinc silicate; average particle size: 0.02 μm; manufactured by Sakai Chemical Industry Co., Ltd.).

In the composition of the present invention, from the viewpoint of flame retardancy, the content of zinc oxide, which is the component (D), is preferably 0.01 to 10 parts by mass, more preferably 0.5 to 8 parts by mass, even more preferably 1 to 5 parts by mass, with respect to 100 parts by mass in total of the component (A) and the component (B). Setting the content of zinc oxide to 0.01 parts by mass or greater further improves flame retardancy. Setting the content of zinc oxide to 10 parts by mass or less suppresses negative effects on processability.

It is preferable that the composition of the present invention further includes at least one type of component (component (E)) selected from silicone oils, epoxy-based coupling agents, hydrotalcites, and slip additives, from the viewpoint of preventing aggregation of flame retardant powder, and also improving storage stability, improving dispersibility to synthetic resin, and improving flame retardancy.

Examples of silicone oils include: dimethyl silicone oils in which the side chains and terminals of polysiloxane are all methyl groups; methylphenyl silicone oils in which the side chains and terminals of polysiloxane are methyl groups with some of the side chains being phenyl groups; methyl hydrogen silicone oils in which the side chains and terminals of polysiloxane are methyl groups with some of the side chains being hydrogen; and copolymers of the above. It is also possible to use modified silicone oils, such as amine-modified, epoxy-modified, alicyclic epoxy-modified, carboxyl-modified, carbinol-modified, mercapto-modified, polyether-modified, long-chain alkyl-modified, fluoroalkyl-modified, higher fatty acid ester-modified, higher fatty acid amide-modified, silanol-modified, diol-modified, phenol-modified, and/or aralkyl-modified silicone oils, in which organic groups are introduced into some of the side chains and/or terminals.

Concrete examples of the silicone oils are listed below. Examples of dimethyl silicone oils include KF-96 (manufactured by Shin-Etsu Chemical Co., Ltd.), KF-965 (manufactured by Shin-Etsu Chemical Co., Ltd.), and KF-968 (manufactured by Shin-Etsu Chemical Co., Ltd.). Examples of methyl hydrogen silicone oils include KF-99 (manufactured by Shin-Etsu Chemical Co., Ltd.), KF-9901 (manufactured by Shin-Etsu Chemical Co., Ltd.), HMS-151 (manufactured by Gelest Inc.), HMS-071 (manufactured by Gelest Inc.), HMS-301 (manufactured by Gelest Inc.), and DMS-H21 (manufactured by Gelest Inc.). Examples of methylphenyl silicone oils include KF-50 (manufactured by Shin-Etsu Chemical Co., Ltd.), KF-53 (manufactured by Shin-Etsu Chemical Co., Ltd.), KF-54 (manufactured by Shin-Etsu Chemical Co., Ltd.), and KF-56 (manufactured by Shin-Etsu Chemical Co., Ltd.). Examples of epoxy-modified products include X-22-343 (manufactured by Shin-Etsu Chemical Co., Ltd.), X-22-2000 (manufactured by Shin-Etsu Chemical Co., Ltd.), KF-101 (manufactured by Shin-Etsu Chemical Co., Ltd.), KF-102 (manufactured by Shin-Etsu Chemical Co., Ltd.), and KF-1001 (manufactured by Shin-Etsu Chemical Co., Ltd.). An example of a carboxyl-modified product includes X-22-3701E (manufactured by Shin-Etsu Chemical Co., Ltd.). Examples of carbinol-modified products include X-22-4039 (manufactured by Shin-Etsu Chemical Co., Ltd.) and X-22-4015 (manufactured by Shin-Etsu Chemical Co., Ltd.). An example of an amine-modified product includes KF-393 (manufactured by Shin-Etsu Chemical Co., Ltd.).

In the composition of the present invention, methyl hydrogen silicone oils, among the aforementioned silicone oils, are preferable from the viewpoint of preventing aggregation of flame retardant powder and also improving storage stability and improving dispersibility to synthetic resin.

Epoxy-based coupling agents have functions of preventing aggregation of flame retardant powder, improving storage stability, and imparting water resistance and heat resistance. An example of the epoxy-based coupling agent is a compound represented by general formula (5), A—$(CH_2)_k$—$Si(OR)_3$, and including an epoxy group, wherein A represents an epoxy group, k represents a number of 1 to 3, and R represents a methyl group or an ethyl group. Herein, examples of the epoxy group include a glycidoxy group and a 3,4-epoxycyclohexyl group.

Concrete examples of the epoxy-based coupling agents include 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldimethoxysilane, 3-glycidoxypropyltriethoxysilane, and glycidoxyoctyltrimethoxysilane, as examples of epoxy group-containing silane coupling agents.

Hydrotalcites are naturally-occurring or synthetic composite salt compounds including magnesium, aluminum, hydroxyl groups, carbonate groups, and optional water of crystallization, and examples include compounds in which a portion of magnesium and/or aluminum is substituted by an alkali metal or other metals such as zinc, and compounds in which the hydroxyl group(s) and/or carbonate group(s) is/are substituted by other anionic groups. More specifically, examples include hydrotalcites represented by the following formula (3) or compounds in which a metal in a hydrotalcite represented by the following formula (3) is substituted by an alkali metal. Also, as for Al—Li-based hydrotalcites, it is possible to use a compound represented by formula (4).

[Chem. 2]

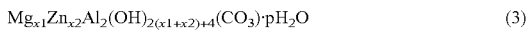

$$Mg_{x1}Zn_{x2}Al_2(OH)_{2(x1+x2)+4}(CO_3)\cdot pH_2O \qquad (3)$$

(In the formula, x1 and x2 each represent a number satisfying the conditions expressed by the following formulas 0≤x2/x1<10 and 2≤x1+x2<20, and p represents 0 or a positive number.)

[Chem. 3]

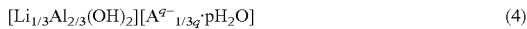

$$[Li_{1/3}Al_{2/3}(OH)_2][A^{q-}{}_{1/3q}\cdot pH_2O] \qquad (4)$$

(In the formula, $A^{q-}$ represents a q-valent anion, and p represents 0 or a positive number.)

Further, in the aforementioned hydrotalcite, a portion of the carbonate anion may be substituted by another anion.

The water of crystallization of the hydrotalcite may be dehydrated. The hydrotalcites may be covered by a higher fatty acid such as stearic acid, a higher fatty acid metal salt such as an alkali metal salt of oleic acid, an organic sulfonic acid metal salt such as an alkali metal salt of dodecylbenzene sulfonic acid, a higher fatty acid amide, a higher fatty acid ester, or a wax.

Examples of slip additives include: purely hydrocarbon-based slip additives, such as liquid paraffin, natural paraffin, microwax, synthetic paraffin, low molecular-weight polyethylene, and polyethylene wax; halogenated hydrocarbon-based slip additives; fatty acid-based slip additives, such as higher fatty acids and oxyfatty acids; fatty acid amide-based slip additives, such as fatty acid amides and bis-fatty acid amides; ester-type slip additives, such as lower alcohol esters of fatty acids, polyol esters of fatty acids such as glyceride, polyglycol esters of fatty acids, and fatty alcohol esters of fatty acids (ester waxes); metal soap, fatty alcohols, polyols, polyglycols, polyglycerols, partial esters of fatty acids and polyols, partial ester slip additives of fatty acids and polyglycols or polyglycerols, silicone oils, and mineral oils. One type of slip additive, or two or more types, may be used.

In cases where the composition of the present invention includes at least one type of component (component (E)) selected from silicone oils, epoxy-based coupling agents, hydrotalcites, and slip additives from the viewpoint of improving flame retardancy, it is preferable that the content of component (E) in the composition of the present invention is 0.01 to 5 parts by mass, more preferably 0.01 to 3 parts by mass, with respect to 100 parts by mass in total of the component (A) and the component (B), from the viewpoint of achieving the effects of including the component (E) more effectively.

Particularly, in cases of including a silicone oil, the content of the silicone oil is preferably 0.01 to 3 parts by mass, more preferably 0.1 to 1 part by mass, with respect to 100 parts by mass in total of the component (A) and the component (B), from the viewpoint of enhancing the aforementioned effects of including the silicone oil.

Particularly, in cases of including an epoxy-based coupling agent in the composition of the present invention, the content of the epoxy-based coupling agent is preferably 0.01 to 3 parts by mass, more preferably 0.1 to 1 part by mass, with respect to 100 parts by mass in total of the component (A) and the component (B), from the viewpoint of enhancing the aforementioned effects of including the epoxy-based coupling agent.

Particularly, in cases of including a hydrotalcite in the composition of the present invention, the content of the hydrotalcite is preferably 0.01 to 5 parts by mass, more preferably 0.1 to 0.5 parts by mass, with respect to 100 parts by mass in total of the component (A) and the component (B), from the viewpoint of enhancing the aforementioned effects of including the hydrotalcite.

Particularly, in cases of including a slip additive in the composition of the present invention, the content of the slip additive is preferably 0.01 to 3 parts by mass, more preferably 0.1 to 0.5 parts by mass, with respect to 100 parts by mass in total of the component (A) and the component (B), from the viewpoint of enhancing the aforementioned effects of including the slip additive.

The composition used in the present invention may include, as necessary, phenol-based antioxidants, phosphite-based antioxidants, thioether-based antioxidants, other antioxidants, nucleating agents, UV absorbers, light stabilizers, plasticizers, fillers, fatty acid metal salts, antistatic agents, pigments, dyes, and the like.

These components may be blended in advance to the composition of the present invention, or may be blended to a synthetic resin at the time of blending the composition to the synthetic resin. It is preferable to stabilize the synthetic resin by blending these components.

Examples of the phenol-based antioxidants include 2,6-di-tert-butyl-4-methylphenol, 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis [3-(3,5-di-tert-butyl-4-hydroxyphenyl)propionate], 2-methyl-4,6-bis(octylsulfanylmethyl)phenol, 2,2'-isobutylidene bis(4,6-dimethylphenol), isooctyl-3-(3,5-di-tert-butyl-4-hydroxyphenyl)propionate, N,N'-hexane-1,6-diyl bis [3-(3,5-di-tert-butyl-4-hydroxyphenyl)propionamide, 2,2'-oxamide-bis [ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-di-tert-butyl-4-hydroxy-benzenepropanoic acid and C13-15 alkyls, 2,5-di-tert-amylhydroquinone, hindered phenol polymer (product name "AO.OH.98" from Adeka Palmarole), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenz[d,f][1,3,2]-dioxaphosphepin, hexamethylene bis [3-(3,5-di-tert-butyl-4-hydroxyphenyl)propionate, calcium bis[monoethyl(3,5-di-tert-butyl-4-hydroxybenzyl)phosphonate], a reaction product between 5,7-bis(1,1-dimethylethyl)-3-hydroxy-2 (3H)-benzofuranone and o-xylene, 2,6-di-tert-butyl-4-(4,6-bis(octylthio)-1,3,5-triazin-2-ylamino)phenol, DL-a-tocophenol (vitamin E), 2,6-bis(α-methylbenzyl)-4-methylphenol, bis[3,3-bis-(4'-hydroxy-3'-tert-butyl-phenyl) butanoic acid]glycol ester, 2,6-di-tert-butyl-p-cresol, 2,6-diphenyl-4-octadecyloxyphenol, stearyl (3,5-di-tert-butyl-4-hydroxyphenyl)propionate, distearyl(3,5-di-tert-butyl-4-hydroxybenzyl)phosphonate, tridecyl-3,5-tert-butyl-4-hydroxybenzyl thioacetate, thiodiethylene-bis [(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene bis(2,6-di-tert-butylphenol), 4,4'-butylidene bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis [2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5- di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl) propionyloxyethyl]isocyanurate, tetrakis[methylene-3-(3', 5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis [2-[3-(3-tert-butyl-4-hydroxy-5-methylphenyl)propanoyloxy]-1,1-dimethylethyl]-2,4,8,10-tetraoxaspiro[5.5]undecane, triethylene glycol bis [3-tert-4-hydroxy-5-methylphenyl)propionate], and 3-(3,5-dialkyl-4-hydroxyphenyl)propionic acid derivatives, such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl) propionic acid amide, and lauryl-3-(3,5-di-tert-butyl-4-hydroxyphenyl)propionic acid amide. One type of the phenol-based antioxidant may be used alone, or two or more types may be used in combination.

The usage amount of the phenol-based antioxidant(s) when blended to a resin is preferably 0.001 to 5 parts by mass, more preferably 0.01 to 1.0 parts by mass, with respect to 100 parts by mass of the flame-retardant resin composition.

Examples of the phosphite-based antioxidants include triphenyl phosphite, diisooctyl phosphite, heptakis(dipropylene glycol) triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol) phosphite, diisodecyl pentaerythritol diphosphite, dioleyl hydrogen phosphite, trilauryl trithiophosphite, bis(tridecyl) phosphite, tris (isodecyl) phosphite, tris(tridecyl) phosphite, diphenyldecyl phosphite, dinonyl phenyl-bis(nonylphenyl) phosphite, poly (dipropylene glycol)phenyl phosphite, tetraphenyl dipropylene glycol diphosphite, trisnonyl phenyl phosphite, tris(2,4-di-tert-butylphenyl) phosphite, tris(2,4-di-tert-butyl-5-methylphenyl) phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, distearyl pentaerythritol diphosphite, a mixture of distearyl pentaerythritol and calcium stearate, alkyl (C10) bisphenol A phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-tert-butyl-6-methylphenyl)ethyl phosphite, tetra(tridecyl)isopropylidene diphenol diphosphite, tetra(tridecyl)-4,4'-n-butylidene bis(2-tert-butyl-5-methylphenol) diphosphite, hexa(tridecyl)-1,1,3-tris(2-methyl-4-hydroxy-5-tert-butylphenyebutane triphosphite, tetrakis(2,4-di-tert-butylphenyl)biphenylene diphosphonite, 9,10-dihydro-9-oxa-10-phosphaphenanthrene-10-oxide, (1-methyl-1-propenyl-3-ylidene)-tris(1,1-dimethylethyl)-5-methyl-4,1-phenylene)hexatrid ecyl phosphite, 2,2'-methylene-bis(4,6-di-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl) fluorophosphite, 4,4'-butylidene bis(3-methyl-6-tert-butylphenylditridecyl) phosphite, tris(2-[(2,4,8,10-tetrakis-tert-butyldibenzo[d,f] [1,3,2]dioxaphosphepin-6-yl)oxy]ethyl)amine, 3,9-bis(4-nonylphenoxy)-2,4,8,10-tetraoxa-3,9-diphosphaspiro[5,5] undecane, 2,4,6-tri-tert-butylphenyl-2-butyl-2-ethyl-1,3-propanediol phosphite, 4,4'-isopropylidene diphenol $C_{12-15}$ alcohol phosphite, 3,9-bis(2,6-di-tert-butyl-4-methylphenyl)-3,9-bis-diphospha-2,4,8,10-tetraoxa-3,9-diphos phespiro[5,5]undecane, diphenyl(isodecyl) phosphite, and biphenyldiphenyl phosphite. One type of the phosphite-based antioxidant may be used alone, or two or more types may be used in combination.

The usage amount of the phosphite-based antioxidant(s) when blended to a resin is preferably 0.001 to 5 parts by mass, more preferably 0.01 to 1.0 parts by mass, with respect to 100 parts by mass of the flame-retardant resin composition.

Examples of the thioether-based antioxidants include 3,3'-thiodipropionic acid, alkyl (C12-14) thiopropionic acid, di(lauryl)-3,3'-thiodipropionate, ditridecyl 3,3'-thiobispropionate, di(myristyl)-3,3'-thiodipropionate, di(stearyl)-3,3'-thiodipropionate, dnoctadecyl)-3,3'-thiodipropionate, lauryl stearyl thiodipropionate, tetrakis[methylene-3-(dodecylthio) propionate]methane, thiobis(2-tert-butyl-5-methyl-4,1-phenylene)bis(3-(dodecylthio)propionate), 2,2'-thiodiethylene-bis(3-aminobutenoate), 4,6-bis(octylthiomethyl)-o-cresol, 2,2'-thiodiethylene-bis[3-(3,5-di-tert-butyl-4-hydroxyphenyl)propionate], 2,2'-thiobis(4-methyl-6-tert-butylphenol), 2,2'-thiobis(6-tert-butyl-p-cresol), 2-ethylhexyl-(3,5-di-tert-butyl-4-hydroxybenzyl)thioacetate, 4,4'-thiobis(6-tert-butyl-3-methylphenol), 4,4'-thiobis(4-methyl-6-tert-butylphenol), 4,4'-[thiobis(methylene)]bis(2-tert-butyl-6-methyl-1-hydroxybenzyl), bis(4,6-di-tert-butylphenol-2-yl) sulfide, tridecyl-3,5-di-tert-butyl-4-hydroxybenzylthioacetate, 1,4-bis(octylthiomethyl)-6-methylphenol, 2,4-bis(dodecylthiomethyl)-6-methylphenol, distearyl-disulfide, and bis(methyl-4-[3-n-alkyl(C12/C14) thiopropionyloxy]5-tert-butylphenyl)sulfide. One type of the thioether-based antioxidant may be used alone, or two or more types may be used in combination.

The usage amount of the thioether-based antioxidant(s) when blended to a resin is preferably 0.001 to 5 parts by mass, more preferably 0.01 to 1.0 parts by mass, with respect to 100 parts by mass of the flame-retardant resin composition.

Examples of other antioxidants include: nitrone compounds, such as N-benzyl-α-phenylnitrone, N-ethyl-α-methylnitrone, N-octyl-α-heptylnitrone, N-lauryl-α-undecylnitrone, N-tetradecyl-α-tridecylnitrone, N-hexadecyl-α-pentadecylnitrone, N-octyl-α-heptadecylnitrone, N-hexadecyl-α-heptadecylnitrone, N-octadecyl-α-pentadecylnitrone, N-heptadecyl-α-heptadecylnitrone, and N-octadecyl-α-heptadecylnitrone; and benzofuran compounds, such as 3-arylbenzofuran-2(3H)-one, 3-(alkoxyphenyl)benzofuran-2-one, 3-(acyloxyphenyl)benzofuran-2(3H)-one, 5,7-di-tert-butyl-3-(3,4-dimethylphenyl)-benzofuran-2(3H)-one,5,7-di-tert-butyl-3-(4-hydroxyphenyl)-benzofuran-2 (3H)-one, 5,7-di-tert-butyl-3-4-(2-hydroxyethoxy)phenyl)-benzofuran-2(3H)-one, 6-(2-(4-(5,7-di-tert-2-oxo-2,3-dihydrobenzofuran-3-yl)phenoxy)ethoxy)-6-oxo-hexyl-6-((6-hydroxyhexanoyl)oxy)hexanoate, and 5-di-tert-butyl-3-(4-((15-hydroxy-3,6,9,13-tetraoxapentadecyl)oxy)phenyl) benzofuran-2(3H)one. One type of the other antioxidant may be used alone, or two or more types may be used in combination.

The usage amount of the other antioxidant(s) when blended to a resin is preferably 0.001 to 5 parts by mass, more preferably 0.01 to 1.0 parts by mass, with respect to 100 parts by mass of the flame-retardant resin composition.

Examples of the nucleating agents include: metal salts of carboxylic acids, such as sodium benzoate, aluminum 4-tert-butylbenzoate, sodium adipate, and 2-sodium bicyclo[2.2.1] heptane-2,3-dicarboxylate; metal salts of phosphates, such as sodium bis(4-tert-butylphenyl)phosphate, sodium 2,2'- methylene-bis(4,6-di-tert-butylphenyl)phosphate, and lithium 2,2'-methylene-bis(4,6-di-tert-butylphenyl)phosphate; polyol derivatives, such as dibenzylidene sorbitol, bis(methylbenzylidene)sorbitol, bis(3,4-dimethylbenzylidene)sorbitol, bis(p-ethylbenzylidene)sorbitol, bis(dimethylbenzylidene)sorbitol, 1,2,3-trideoxy-4,6:5,7-bis-O-((4-propylphenyl)methylene)-nonitol, 1,3:2,4-bis(p-methylbenzylidene)sorbitol, and 1,3:2,4-bis-O-benzylidene-D-glucitol (dibenzylidene sorbitol); and amide compounds, such as N,N',N''-tris[2-methylcyclohexyl]-1,2,3-propane tricarboxamide, N,N',N''-tricyclohexyl-1,3,5-benzene tricarboxamide, N,N'-dicyclohexyl-naphthalene dicarboxamide, and 1,3,5-tri(dimethylisopropoylamino)benzene. One type of the nucleating agent may be used alone, or two or more types may be used in combination. The usage amount of the nucleating agent(s) when blended to a resin is preferably 0.001 to 5 parts by mass, more preferably 0.01 to 1.0 parts by mass, with respect to 100 parts by mass of the flame-retardant resin composition.

Examples of the UV absorbers include: benzophenones, such as 2,4-dihydroxybenzophenone, 5,5'-methylene-bis(2-hydroxy-4-methoxybenzophenone), 2-hydroxy-4-n-octoxybenzophenone, 2-hydroxy-4-methoxybenzophenone, 2-hydroxy-4-dodecyloxybenzophenone, and 2,2'-dihydroxy-4-methoxybenzophenone; benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), a polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadec yl(3,5-di-tert-butyl-4-hydroxy)benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide, 2-ethoxy-4'-dodecyloxanilide, and 2-ethyl-2'-ethoxy-5'-tert-butyl-oxanilide; cyanoacrylates, such as ethyl-α-cyano-β,β-diphenylacrylate, methyl-2-cyano-3-methyl-3-(p-methoxyphenyeacrylate, and tetrakis(α-cyano-β,β-diphenyl acryloyloxymethyl)methane; and triazines, such as 2-(2-hydroxy-4-(2-(2-ethylhexanoyloxy)ethyloxy)-4,6-diphenyl-1,3,5-triazine, 2,4,6-tris(2-hydroxy-4-hexyloxy-3-methylphenyl)-1,3,5-triazine, 2-(2-hydroxy-4-octyloxyphenyl)-4,6-bis(2,4-dimethylphenyl)-1,3,5-triazine, 2-(4,6-diphenyl-1,3,5-triazine-2-yl)-5-hexyloxyphenol, and 2-(4,6-di(1,1'-biphenyl)4-yl)-1,3,5-triazine-2-yl)-5-(2-ethylhexyloxy) phenol.

One type of the UV absorber may be used alone, or two or more types may be used in combination.

The usage amount of the UV absorber(s) when blended to a resin is preferably 0.001 to 5 parts by mass, more preferably 0.05 to 0.5 parts by mass, with respect to 100 parts by mass of the flame-retardant resin composition.

Examples of the light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl).di(tridecl)-1,2,3,4-butane tetracarboxylate, bis(1,2,2,6,6-pentamethyl-4-piperidyl).di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-trizine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, 1,6,11-tris[2,4-bis(N-butyl-N-(1,2,2,6,6-pentamethyl-4-piperidyl)amino)-s-triazin-6-yl]a minoundecane, bis{4-(1-octyloxy-2,2,6,6-tetramethyl) piperidyl}decanedionate, bis(4-(2,2,6,6-tetramethyl-1-undecyloxy)piperidyl) carbonate, TINUVINNOR 371 from Ciba Specialty Chemicals, 2,2,6,6-tetramethyl-4-piperidyl methacrylate, 1,2,3,4-butanetetracarboxylic acid, polymer with 2,2-bis(hydroxymethyl)-1,3-propanediol and 3-hydroxy-2,2-dimethylpropanal, 1,2,2,6,6-pentamethyl-4-piperidinyl ester, 1,3-bis(2,2,6,6-tetramethylpiperidine-4-yl)2,4-ditridecylbenzene-1,2,3,4,tetracarboxylate, bis(1-octyloxy-2,2,6,6-pentamethyl-4-piperidyl) sebacate, and poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

One type of the light stabilizer may be used alone, or two or more types may be used in combination.

The usage amount of the light stabilizer(s) when blended to a resin is preferably 0.001 to 5 parts by mass, more preferably 0.005 to 0.5 parts by mass, with respect to 100 parts by mass of the flame-retardant resin composition.

Examples of the plasticizers include: epoxies, such as epoxidized soybean oil, epoxidized linseed oil, and epoxidized fatty acid octyl ester; methacrylates; polyesters, such as a polycondensate of a dicarboxylic acid and a polyol or a polycondensate of a polycarboxylic acid and a polyol; polyether-esters, such as a polycondensate of a dicarboxylic acid, a polyol and an alkylene glycol, a polycondensate of a dicarboxylic acid, a polyol and an arylene glycol, a polycondensate of a polycarboxylic acid, a polyol and an alkylene glycol, or a polycondensate of a polycarboxylic acid, a polyol and an arylene glycol; aliphatic esters, such as adipic acid esters and succinic acid esters; and aromatic esters, such as phthalic acid esters, terephthalic acid esters, trimellitic acid esters, pyromellitic acid esters, and benzoic acid esters. One type of the plasticizer may be used alone, or two or more types may be used in combination.

The usage amount of the plasticizer(s) when blended to a resin is preferably 0.1 to 500 parts by mass, more preferably 1 to 100 parts by mass, with respect to 100 parts by mass of the flame-retardant resin composition.

Examples of the fillers include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fiber, clay, dolomite, mica, silica, alumina, potassium titanate whisker, wollastonite, fibrous magnesium oxysulfate, and montmorillonite. Fillers may be used by selecting, as appropriate, the particle diameter (the fiber diameter, fiber length, and aspect ratio for fibrous fillers). One type of the filler may be used alone, or two or more types may be used in combination.

The usage amount of the filler(s) when blended to a resin is preferably 1 to 100 parts by mass, more preferably 3 to 80 parts by mass, with respect to 100 parts by mass of the flame-retardant resin composition.

Examples of fatty acids in the aforementioned fatty acid metal salts include: saturated fatty acids, such as capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanic acid, and melissic acid; linear unsaturated fatty acids, such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid; and aromatic fatty acids, such as trimesic acid. Particularly, saturated fatty acids, such as myristic acid, stearic acid, and 12-hydroxystearic acid, are preferred. Examples of metals in the aforementioned fatty acid metal salts include alkali metals, magnesium, calcium, strontium, barium, titanium, manganese, iron, zinc, silicon, zirconium, yttrium, barium, and hafnium. Particularly, alkali metals, such as sodium, lithium, and potassium, are preferred. One type of the fatty acid metal salt may be used alone, or two or more types may be used in combination.

The usage amount of the fatty acid metal salt(s) when blended to a resin is preferably 0.001 to 5 parts by mass, more preferably 0.05 to 3 parts by mass, with respect to 100 parts by mass of the flame-retardant resin composition.

Example of the antistatic agents include: cationic antistatic agents such as quaternary ammonium ion salts of fatty acids and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents such as polyol fatty acid esters, polyglycol phosphates, and polyoxyethylene alkylallyl ethers; and amphoteric antistatic agents such as amphoteric alkyl betaines, e.g. alkyl dimethylaminoacetic acid betaine, and imidazoline-type amphoteric activators. One type of the antistatic agent may be used alone, or two or more types may be used in combination. The usage amount of the antistatic agent(s) when blended to a resin is preferably 0.01 to 20 parts by mass, more preferably 3 to 10 parts by mass, with respect to 100 parts by mass of the flame-retardant resin composition.

Commercially available pigments may be used for the aforementioned pigments, with examples including: pigment red 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; pigment orange 13, 31, 34, 36, 38, 43, 46, 48, 49, 51, 52, 55, 59, 60, 61, 62, 64, 65, and 71; pigment yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; pigment green 7, 10, and 36; pigment blue 15, 15:1, 15:2, 15:3, 15:4, 15:5, 15:6, 22, 24, 56, 60, 61, 62, and 64; and pigment violet 1, 19, 23, 27, 29, 30, 32, 37, 40, and 50. One type of the pigment may be used alone, or two or more types may be used in combination.

The usage amount of the pigment(s) when blended to a resin is preferably 0.0001 to 10 parts by mass with respect to 100 parts by mass of the flame-retardant resin composition.

Commercially available dyes may be used for the aforementioned dyes, with examples including azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes, and cyanine dyes. One type of the dye may be used alone, or two or more types may be used in combination.

The usage amount of the dye(s) when blended to a resin is preferably 0.0001 to 10 parts by mass with respect to 100 parts by mass of the flame-retardant resin composition.

The composition of the present invention can be obtained simply by mixing the essential components (A) to (C) and components (D) and (E), which are added as necessary, together with other optional components as necessary. For mixing, one of various types of mixers can be used. Heating can be performed while mixing. Examples of usable mixers include Turbula mixers, Henschel mixers, ribbon blenders, V-type mixers, W-type mixers, super mixers, and Nauta mixers.

The composition of the present invention is effective in flame-proofing resins, and is useful as a composition for resin (also called "additive for resin"), and particularly as a flame retardant. The composition of the present invention is suitably used as a flame-retardant resin composition (referred to hereinafter also as "flame-retardant resin composition of the present invention") by being blended with a resin.

Examples of resins to be flame-proofed by the composition of the present invention include synthetic resins, such as thermoplastic resins and thermosetting resins. More specifically, examples of thermoplastic resins include: thermoplastic resins such as polyolefin-based resins, biomass-containing polyolefin-based resins, halogen-containing resins, aromatic polyester resins, linear polyester resins, degradable aliphatic resins, polyamide resins, cellulose ester-based resins, polycarbonate resins, polyurethane resins, polyphenylene oxide-based resins, polyphenylene sulfide-based resins, and acrylic-based resin; and blends thereof. Examples of thermosetting resins include phenolic resins, urea resins, melamine resins, epoxy resins, and unsaturated polyester resins.

Examples of other synthetic resins to be flame-proofed by the composition of the present invention include olefin-based thermoplastic elastomers, styrene-based thermoplastic elastomers, polyester-based thermoplastic elastomers, nitrile-based thermoplastic elastomers, nylon-based thermoplastic elastomers, vinyl chloride-based thermoplastic elastomers, polyamide-based thermoplastic elastomers, and polyurethane-based thermoplastic elastomers.

One type of the resin may be used alone, or two or more types may be used in combination. The resins may be alloyed.

Any type of resin may be used in the present invention, regardless of factors such as molecular weight, degree of polymerization, density, softening point, the proportion of portions insoluble to a solvent, the degree of stereoregularity, presence/absence of catalyst residue, types and content ratio of starting material monomers, and types of polymerization catalysts (e.g., Ziegler catalyst, metallocene catalyst, etc.).

Among the aforementioned types of resins, polyolefin-based resins and polyurethane-based thermoplastic elastomers are preferable from the viewpoint that excellent flame retardancy can be imparted. Examples of polyolefin-based resins include: $\alpha$-olefin polymers, such as polyethylene, low-density polyethylene, linear low-density polyethylene, high-density polyethylene, polypropylene, homopolypropylene, random copolymer polypropylene, block copolymer polypropylene, impact copolymer polypropylene, high-impact copolymer polypropylene, isotactic polypropylene, syndiotactic polypropylene, hemiisotactic polypropylene, maleic anhydride-modified polypropylene, polybutene, cycloolefin polymer, stereoblock polypropylene, poly-3-methyl-1-butene, poly-3-methyl-1-pentene, and poly-4-methyl-1-pentene; and $\alpha$-olefin copolymers, such as ethylene/propylene block or random copolymer, ethylene-methyl methacrylate copolymer, and ethylene-vinyl acetate copolymer.

Examples of polyurethane-based thermoplastic elastomers include thermoplastic polyurethane resins (TPU). Thermoplastic polyurethane resins (TPU) are rubber-like elastic materials having a urethane group (—NHCOO—) in the molecular structure thereof, and consist of mobile long-chain moieties referred to as soft segments, and very-highly crystalline moieties referred to as hard segments. In general, TPUs are prepared by using a polyol, diisocyanate, and a chain extension agent.

Depending on shaping methods, the thermoplastic polyurethane resins can be roughly classified into: a mold-casting type that is introduced into a mold as a liquid and subjected to curing reaction in the mold; a type that is press-shaped after being roll-kneaded, like conventional rubbers; and a type that can be processed like general thermoplastic resins. In the present invention, no distinction is made among the aforementioned types.

Concrete examples of the thermoplastic polyurethane resins include ester (lactone) based polyurethane copolymers, ester (adipate) based polyurethane copolymers, ether-based polyurethane copolymers, carbonate-based polyurethane copolymers, and ether-ester-based polyurethane copolymers. The thermoplastic polyurethane resin (TPU) may be used singly, or may be used in combination.

In the flame-retardant resin composition of the present invention, the content of resin is preferably 50 to 99.9 mass %, more preferably 60 to 90 mass %. In cases where the flame-retardant resin composition includes the composition of the present invention as a flame retardant composition, it is preferable that 10 to 400 parts by mass, more preferably 20 to 80 parts by mass, of the flame retardant composition is included with respect to 100 parts by mass of resin. Setting the content of the flame retardant composition to 10 parts by mass or greater achieves sufficient flame retardancy, while setting the content to 400 parts by mass or less suppresses impairment of the intrinsic physical properties of the resin.

A shaped article having excellent flame retardancy can be produced by shaping the flame-retardant resin composition of the present invention. There is no particular limitation to the methods for shaping, and examples thereof include extrusion, calendering, injection molding, rolling, compression molding, and blow molding. Various shaped articles having a variety of shapes can be manufactured, such as resin plates, sheets, films, and odd-form components.

The flame-retardant resin composition of the present invention and shaped product thereof can be used in a wide variety of industries, such as electricity, digital, telecommunications, electronics, engineering, agriculture, forestry, fisheries, mining, construction, foods, textiles, clothing, medical products/services, coal, oil, rubber, leather, automobiles, precision instruments, lumber, construction materials, civil engineering, furniture, printing, and musical instruments. More specifically, the invention can be used for: office supplies and office-automation equipment such as printers, personal computers, word processors, keyboards, PDAs (or compact information terminals), telephones, copying machines, facsimile machines, ECRs (electronic cash registers), calculators, electronic organizers, cards, holders, and stationery; home electrical appliances such as washing machines, refrigerators, vacuum cleaners, microwave ovens, lighting fixtures, game devices, irons, and foot warmers; audio-visual equipment such as TVs, videocassette recorders, video cameras, radio-cassette recorders, tape recorders, mini discs, CD players, loudspeakers, and liquid crystal displays; electrical/electronic components and telecommunications equipment such as connectors, relays, capacitors, switches, printed-circuit boards, coil bobbins, sealing materials for semiconductors, sealing materials for LEDs, electrical wires, cables, transformers, deflection yokes, distribution switchboards, and clocks; housings (frames, casings, covers, exterior materials) and components of office-automation equipment, etc.; and automotive interior/exterior materials. Among the above, the composition/shaped product can be suitably used particularly for electronic components, such as electrical wires, and automotive components, such as automotive interior/exterior materials.

The flame-retardant resin composition of the present invention and shaped product thereof can be used in various applications such as: materials for automobiles, hybrid cars, electric cars, vehicles, ships, airplanes, architecture, houses, and buildings, such as seats (stuffing, outer cloth, etc.), belts, ceiling cladding, convertible tops, armrests, door trims, rear package trays, carpets, mats, sun visors, wheel covers, mattress covers, airbags, insulators, straps, strap belts, wire coverings, electrical insulators, paint, coating materials, overlay materials, floor materials, corner walls, carpets, wallpapers, wall cladding, exterior cladding, interior cladding, roof materials, deck materials, wall materials, pillar materials, decking, fence materials, framework, molding, windows, door-shape materials, shingles, panel boards, terraces, balconies, acoustical insulation boards, heat-insulating boards, and window materials; civil engineering materials; and everyday commodities and sporting goods, such as clothing, curtains, bed linen, plywood, synthetic fiber boards, rugs, doormats, sheets, buckets, hoses, containers, eyeglasses, bags, cases, goggles, skis, rackets, tents, and musical instruments.

EXAMPLES

The present invention is described in further detail below according to Working examples. The present invention, however, is not limited whatsoever by the following Working examples. It should be noted that the unit of the numerical values in Tables 1 to 4 below is "parts by mass", and the unit of the maximum heat release rate in Tables 5 to 8 is "kW·m$^{-2}$".

{Preparation of Composition}

Working Examples Nos. 1 to 30 and Comparative Examples Nos. 1 to 22:

The components described in Tables 1 to 4 below were blended according to the respective proportions described in the Tables, and were mixed using a Henschel mixer, to obtain Working Compositions Nos. 1 to 30 and Comparative Compositions Nos. 1 to 22. In cases of adding an epoxy-based coupling agent, a slip additive, or a silicone oil, the respective compositions were obtained by first preliminarily mixing the other components, and then adding the epoxy-based coupling agent, slip additive, or silicone oil and performing mixing using a Henschel mixer. For the epoxy-based coupling agent, a compound satisfying the aforementioned general formula (5) was used.

It should be noted that the annotation *1 in Table 1 applies to Tables 2 to 4, and the annotations *2 to *6 in Table 2 apply to Tables 3 and 4.

TABLE 1

| | | Working Example No. | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Component (A) | Melamine polyphosphate | 40 | 40 | 40 | 40 | 40 | 40 | 40 | 40 | 40 | 40 | 40 | 40 | 40 | 40 | 40 |
| | Melamine pyrophosphate | | | | | | | | | | | | | | | |
| | Melamine orthophosphate | | | | | | | | | | | | | | | |
| Component (B) | Piperazine polyphosphate | 60 | 60 | 60 | 60 | 60 | 60 | 60 | 60 | 60 | 60 | 60 | 60 | 60 | 60 | 60 |
| | Piperazine pyrophosphate | | | | | | | | | | | | | | | |
| | Piperazine orthophosphate | | | | | | | | | | | | | | | |
| Component (C) | Cyanuric acid | 1 | 3 | 5 | 7 | 10 | 15 | 20 | | | | | | | | |
| | Zinc cyanurate *1) | | | | | | | | 1 | 3 | 5 | 7 | 10 | 15 | 20 | 30 |

*1) Starfine (manufactured by Nissan Chemical Industries, Ltd.)

TABLE 2

| | | Working Example No. | | | | | | | | | | | | | | |
|---|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 |
| Component (A) | Melamine polyphosphate | 10 | 20 | 30 | 40 | 50 | | | | | | | | | | |
| | Melamine pyrophosphate | | | | | | 10 | 20 | 40 | 40 | 50 | | | | | |
| | Melamine orthophosphate | | | | | | | | | | | 10 | 20 | 30 | 40 | 50 |
| Component (B) | Piperazine polyphosphate | 90 | 80 | 70 | 60 | 50 | | | | | | | | | | |
| | Piperazine pyrophosphate | | | | | | 90 | 80 | 60 | 60 | 50 | | | | | |
| | Piperazine orthophosphate | | | | | | | | | | | 90 | 80 | 70 | 60 | 50 |
| Component (C) | Cyanuric acid | 1 | 3 | | | | 3 | 5 | 5 | | | 1 | 3 | | | 3 |
| | Zinc cyanurate | | | 5 | 7 | 1 | | | | | 5 | | | 5 | 7 | 1 |
| Component (D) | Zinc oxide *2) | 1 | 3 | 5 | 1 | 3 | 5 | 1 | 5 | 5 | 1 | 3 | 5 | 1 | 3 | 7 |
| Component (E) | Silicone oil *3) | 0.3 | 0.5 | 1 | | | | 0.3 | | | | | | | | |
| | Epoxy-based coupling agent *4) | | | | 0.3 | 0.5 | 1 | | 1 | 1 | 0.3 | | | | | |
| | Hydrotalcite *5) | | | | | | | 0.5 | | | | 0.1 | 0.5 | | 1 | |
| | Slip additive *6) | | | | | | | | | 0.1 | 0.1 | | | 0.3 | 0.1 | 1 |

*2) Zinc Oxide Grade 1 (manufactured by Mitsui Mining and Smelting Co., Ltd.)
*3) KF-99 (manufactured by Shin-Etsu Silicone)
*4) Molecular weight: 246.4; specific gravity: 1.07 (manufactured by Nichibi Trading Co., Ltd.)
*5) DHT-4A (Kyowa Chemical Industry Co., Ltd.)
*6) Adipic acid ether-ester-based slip additive (molecular weight: 434; specific gravity: 1.020; SP value: 9.2) (manufactured by ADEKA Corporation)

TABLE 3

| | | Comparative Example No. | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Component (A) | Melamine polyphosphate | 10 | 20 | 30 | 40 | 50 | | | | | | | | | | | | |
| | Melamine pyrophosphate | | | | | | 10 | 20 | 30 | 40 | 50 | | | | | | 40 | 40 |
| | Melamine orthophosphate | | | | | | | | | | | 10 | 20 | 30 | 40 | 50 | | |
| Component (B) | Piperazine polyphosphate | 90 | 80 | 70 | 60 | 50 | | | | | | | | | | | | |
| | Piperazine pyrophosphate | | | | | | 90 | 80 | 70 | 60 | 50 | | | | | | 60 | 60 |
| | Piperazine orthophosphate | | | | | | | | | | | 90 | 80 | 70 | 60 | 50 | | |
| Phosphoric acid ester *7) | | | | | | | | | | | | | | | | | 5 | |
| Phosphoric acid ester *8) | | | | | | | | | | | | | | | | | | 5 |
| Component (C) | Cyanuric acid | | | | | | | | | | | | | | | | | |
| | Zinc cyanurate | | | | | | | | | | | | | | | | | |
| Component (D) | Zinc oxide | 1 | 3 | 5 | 1 | 3 | 5 | 1 | 1 | 5 | 5 | 1 | 1 | 3 | 5 | 1 | 5 | 5 |
| Component (E) | Silicone oil | 0.3 | 0.5 | 1 | | | | 0.3 | | | | 0.3 | | | | 0.3 | | |
| | Epoxy-based coupling agent | | | | 0.3 | 0.5 | 1 | | 0.3 | 1 | 1 | | 0.3 | 0.5 | 1 | | 1 | 1 |
| | Hydrotalcite | | | | | | | | 0.5 | | | | 0.5 | | | 0.5 | | |
| | Slip additive | | | | | | | | | | 0.1 | | | | | | 0.1 | 0.1 |

*7) PX-200 (manufactured by Daihachi Chemical Industry Co., Ltd.)
*8) PX-202 (manufactured by Daihachi Chemical Industry Co., Ltd.)

TABLE 4

| | | Comparative Example No. | | | | |
|---|---|---|---|---|---|---|
| | | 18 | 19 | 20 | 21 | 22 |
| Component (A) | Melamine polyphosphate | | | | | |
| | Melamine pyrophosphate | 40 | | 40 | | 40 |
| | Melamine orthophosphate | | | | | |
| Component (B) | Piperazine polyphosphate | | | | | |
| | Piperazine pyrophosphate | | 60 | | 60 | 60 |
| | Piperazine orthophosphate | | | | | |
| Component (C) | Cyanuric acid | 5 | 5 | | | |
| | Zinc cyanurate | | | 5 | 5 | |
| | Calcium cyanurate | | | | | 5 |
| Component (D) | Zinc oxide | 5 | 5 | 5 | 5 | 5 |
| Component (E) | Silicone oil | | | | | |
| | Epoxy-based coupling agent | 1 | 1 | 1 | 1 | 1 |
| | Hydrotalcite | | | | | |
| | Slip additive | 0.1 | 0.1 | 0.1 | 0.1 | 0.1 |

Working Examples 31 to 47 and Comparative Examples 23 to 44:

To 100 parts by mass of a thermoplastic polyurethane resin (Elastollan 1185A manufactured by BASF; MFI: 8 g/10 min) were blended 0.1 parts by mass of calcium stearate, 0.3 parts by mass of glycerol monostearate, 0.1 parts by mass of tetrakis[methyl 3-(3,5-di-tert-butyl-4-hydroxyphenyl)propionate]methane, and 0.1 parts by mass of 2,2'-methylene-bis(4,6-di-tert-butylphenyl)-2-ethylhexyl phosphite, and the blend was preliminarily mixed with a Henschel mixer, to obtain a thermoplastic polyurethane resin composition. To the obtained thermoplastic polyurethane resin composition was blended 43 parts by mass of one of the compositions as shown in Table 5 or Table 6, and the blend was mixed with a Henschel mixer, to obtain Working Resin Compositions Nos. 31 to 47 and Comparative Resin Compositions Nos. 23 to 44.

Working Examples 48 to 59 and Comparative Examples 45 to 54:

To 100 parts by mass of polypropylene (having a melt flow rate of 8 g/10 min at a load of 2.16 kg at 230° C. as measured in conformity with JIS K7210) were added 0.1 parts by mass of calcium stearate (higher fatty acid metal salt), 0.1 parts by mass of tetrakis[methyl 3-(3,5-di-tert-butyl-4-hydroxyphenyl)propionate]methane (phenol-based antioxidant), and 0.1 parts by mass of tris(2,4-di-tert-butylphenyl) phosphite (phosphorus-based antioxidant), and the blend was preliminarily mixed with a Henschel mixer, to obtain a polypropylene resin composition. To the obtained polypropylene resin composition was added 43 parts by mass of one of the compositions as shown in Table 7 or Table 8, and the blend was mixed with a Henschel mixer, to obtain Working Resin Compositions Nos. 48 to 59 and Comparative Resin Compositions Nos. 45 to 54.

The Working Resin Compositions and Comparative Resin Compositions obtained as above were prepared into pellets according to the method below. From the pellets, flame retardancy evaluation test pieces were prepared. The test pieces were subjected to flame retardancy evaluation and maximum heat release rate evaluation described below.

{Evaluation}

{Preparation of Pellets}

Each of Working Resin Compositions Nos. 31 to 47 and Comparative Resin Compositions Nos. 23 to 44, which contained thermoplastic polyurethane resin, was molten and kneaded with a biaxial extruder (TEX-30a manufactured by Japan Steel Works, Ltd.) at a cylinder temperature of 190° C. to 200° C. and a screw speed of 150 rpm. The strands ejected from the die were cooled with a cooling bath and were cut with a pelletizer, to prepare pellets of the respective resin compositions.

Each of Working Resin Compositions Nos. 48 to 59 and Comparative Resin Compositions Nos. 45 to 54, which contained polypropylene resin, was molten and kneaded with a biaxial extruder (TEX-30α manufactured by Japan Steel Works, Ltd.) at a cylinder temperature of 220° C. to 230° C. and a screw speed of 150 rpm. The strands ejected from the die were cooled with a cooling bath and were cut with a pelletizer, to prepare pellets of the respective resin compositions.

{Preparation of Flame Retardancy Evaluation Test Pieces}

The respective pellets of Working Resin Compositions Nos. 31 to 47 and Comparative Resin Compositions Nos. 23 to 44, which contained thermoplastic polyurethane resin, were subjected to injection molding using NEX-80 (manufactured by Nissei Plastic Industrial Co., Ltd.) at a screw setting temperature of 200° C. and mold temperature of 40° C., to obtain respective flame retardancy evaluation test pieces having a length of 127 mm, width of 12.7 mm, and thickness of 1.6 mm.

The respective pellets of Working Resin Compositions Nos. 48 to 59 and Comparative Resin Compositions Nos. 45 to 54, which contained polypropylene resin, were subjected to injection molding using NEX-80 (manufactured by Nissei Plastic Industrial Co., Ltd.) at a screw setting temperature of 230° C. and mold temperature of 40° C., to obtain respective flame retardancy evaluation test pieces having a length of 127 mm, width of 12.7 mm, and thickness of 1.6 mm {Preparation of Test Pieces for Maximum Heat Release Rate Evaluation}

The respective pellets of Working Resin Compositions Nos. 31 to 47 and Comparative Resin Compositions Nos. 23 to 44, which contained thermoplastic polyurethane resin, were subjected to injection molding using NEX-80 (manufactured by Nissei Plastic Industrial Co., Ltd.) at a screw setting temperature of 180° C. and mold temperature of 40° C., to obtain respective test pieces for maximum heat release amount evaluation having a length of 100 mm, width of 100 mm, and thickness of 3 mm.

The respective pellets of Working Resin Compositions Nos. 48 to 59 and Comparative Resin Compositions Nos. 45 to 54, which contained polypropylene resin, were subjected to injection molding using NEX-80 (manufactured by Nissei Plastic Industrial Co., Ltd.) at a screw setting temperature of 230° C. and mold temperature of 40° C., to obtain respective flame retardancy evaluation test pieces having a length of 127 mm, width of 12.7 mm, and thickness of 1.6 mm {Flame Retardancy Evaluation}

Each obtained test piece was subjected to a 20-mm vertical burning test (UL-94V) in conformity with ISO 1210. More specifically, the test piece was held vertically, a burner flame was placed in contact with the lower end of the test piece for 10 seconds and then the flame was removed, and the time it took for the fire that caught on the test piece to cease was measured. Then, upon cessation of the burning, a burner flame was placed in contact with the test piece for 10 seconds for the second time, and the time it took for the fire that caught on the test piece to cease was measured, like the first time. At the same time, evaluation was made as to whether or not flaming particles that dropped from the test piece caused ignition of a piece of cotton located below the test piece. From the first and second combustion times and whether or not the cotton piece ignited, each test piece was ranked according to the UL-94V standard. The combustion rank V-0 is the highest rank, and flame retardancy decreases in the order of V-1 to V-2. Note that test pieces that do not fall under any of the ranks V-0 to V-2 are indicated as NR. The evaluation results are shown in Tables 5 to 8 below.

{Maximum Heat Release Rate Evaluation}

Each obtained test piece was subjected to maximum heat release rate evaluation by using a cone calorimeter (CONE III manufactured by Toyo Seiki Seisaku-sho, Ltd.) in conformity with ISO 5660, wherein the heat flux to the test piece was 50 kW/m². The evaluation results are shown in Tables 5 to 8 below.

TABLE 5

Thermoplastic polyurethane resin composition

| | Working Composition | Flame retardancy | Maximum heat release rate |
|---|---|---|---|
| Working Example 31 | No.1 | V-0 | 165 |
| Working Example 32 | No.2 | V-0 | 140 |
| Working Example 33 | No.3 | V-0 | 131 |
| Working Example 34 | No.4 | V-0 | 130 |
| Working Example 35 | No.5 | V-0 | 129 |
| Working Example 36 | No.6 | V-0 | 128 |
| Working Example 37 | No.7 | V-0 | 128 |
| Working Example 38 | No.8 | V-0 | 163 |
| Working Example 39 | No.9 | V-0 | 138 |
| Working Example 40 | No.10 | V-0 | 129 |
| Working Example 41 | No.11 | V-0 | 128 |
| Working Example 42 | No.12 | V-0 | 128 |
| Working Example 43 | No.13 | V-0 | 128 |
| Working Example 44 | No.14 | V-0 | 128 |
| Working Example 45 | No.15 | V-0 | 128 |
| Working Example 46 | No.23 | V-0 | 127 |
| Working Example 47 | No.24 | V-0 | 125 |

TABLE 6

Thermoplastic polyurethane resin composition

| | Comparative Composition | Flame retardancy | Maximum heat release rate |
|---|---|---|---|
| Comparative Example 23 | No.1 | V-2 | 254 |
| Comparative Example 24 | No.2 | V-2 | 287 |
| Comparative Example 25 | No.3 | V-2 | 221 |
| Comparative Example 26 | No.4 | V-2 | 238 |
| Comparative Example 27 | No.5 | V-2 | 257 |
| Comparative Example 28 | No.6 | V-2 | 211 |
| Comparative Example 29 | No.7 | V-2 | 245 |
| Comparative Example 30 | No.8 | V-2 | 214 |
| Comparative Example 31 | No.9 | V-2 | 181 |
| Comparative Example 32 | No.10 | V-2 | 203 |
| Comparative Example 33 | No.11 | V-2 | 222 |
| Comparative Example 34 | No.12 | V-2 | 253 |
| Comparative Example 35 | No.13 | V-2 | 274 |
| Comparative Example 36 | No.14 | V-2 | 282 |
| Comparative Example 37 | No.15 | V-2 | 271 |
| Comparative Example 38 | No.16 | V-2 | 315 |
| Comparative Example 39 | No.17 | V-2 | 317 |
| Comparative Example 40 | No.18 | NR | >700 |
| Comparative Example 41 | No.19 | NR | >700 |
| Comparative Example 42 | No.20 | NR | >700 |
| Comparative Example 43 | No.21 | NR | >700 |
| Comparative Example 44 | No.22 | NR | 260 |

TABLE 7

Polypropylene resin composition

| | Working Composition | Flame retardancy | Maximum heat release rate |
|---|---|---|---|
| Working Example 48 | No.2 | V-0 | 143 |
| Working Example 49 | No.3 | V-0 | 135 |
| Working Example 50 | No.4 | V-0 | 133 |
| Working Example 51 | No.5 | V-0 | 132 |
| Working Example 52 | No.9 | V-0 | 141 |
| Working Example 53 | No.10 | V-0 | 132 |
| Working Example 54 | No.11 | V-0 | 131 |
| Working Example 55 | No.12 | V-0 | 131 |
| Working Example 56 | No.13 | V-0 | 131 |
| Working Example 57 | No.14 | V-0 | 131 |
| Working Example 58 | No.23 | V-0 | 130 |
| Working Example 59 | No.24 | V-0 | 128 |

TABLE 8

Polypropylene resin composition

| | Comparative Composition | Flame retardancy | Maximum heat release rate |
|---|---|---|---|
| Comparative Example 45 | No.4 | V-2 | 142 |
| Comparative Example 46 | No.9 | V-2 | 185 |
| Comparative Example 47 | No.14 | V-2 | 286 |
| Comparative Example 48 | No.16 | V-2 | 319 |
| Comparative Example 49 | No.17 | V-2 | 321 |
| Comparative Example 50 | No.18 | NR | >700 |
| Comparative Example 51 | No.19 | NR | >700 |
| Comparative Example 52 | No.20 | NR | >700 |
| Comparative Example 53 | No.21 | NR | >700 |
| Comparative Example 54 | No.22 | NR | 150 |

As is clear from the results shown in Tables 5 and 7, it is understood that the Working Examples, in which the respective compositions containing the component (A), component (B), and component (C) were blended to a resin, are improved in terms of the resin's flame retardancy evaluation according to the UL-94V test, and also improved in terms of maximum heat release rate. In contrast, it is understood that, as shown in Tables 6 and 8, in cases where the component (C) is not used (Comparative Examples 23 to 37 and 45 to 47), in cases where one of the component (A) and component (B) is not used (Comparative Examples 40 to 43 and 50 to 53), in cases where a phosphoric acid ester compound was used instead of the component (A), component (B), or component (C) (Comparative Examples 38, 39, 48, and 49), and in cases where a cyanurate different from a zinc salt was used (Comparative Examples 44 and 54), flame retardancy evaluation was poor and the maximum heat release rate was insufficient.

It is thus understood that the compositions according to the present invention can impart high flame retardancy to resins, and are superior as flame retardants.

INDUSTRIAL APPLICABILITY

The present invention can provide a composition capable of imparting drip-preventing effects and excellent heat-release suppressing effects by being mixed with a resin and capable of imparting excellent flame retardancy to the resin, and a flame-retardant resin composition including the aforementioned composition and a resin and achieving excellent flame retardancy.

The invention claimed is:

1. A composition comprising component (A), component (B), and component (C), wherein:
    component (A) is at least one melamine salt selected from the group consisting of melamine orthophosphate, melamine pyrophosphate, and melamine polyphosphate;
    component (B) is at least one piperazine salt selected from the group consisting of piperazine orthophosphate, piperazine pyrophosphate, and piperazine polyphosphate; and
    component (C) is cyanuric acid.

2. The composition according to claim 1, comprising 0.1 to 50 parts by mass of the component (C) with respect to 100 parts by mass in total of the component (A) and the component (B).

3. The composition according to claim 1, further comprising, with respect to 100 parts by mass in total of the component (A) and the component (B), 0.01 to 10 parts by mass of component (D) which is zinc oxide.

4. The composition according to claim 1, wherein:
    the composition is a composition for resin; and
    the composition further comprises, with respect to 100 parts by mass in total of the component (A) and the component (B), 0.01 to 5 parts by mass of component (E) which is at least one component selected from the group consisting of silicone oils, epoxy-based coupling agents, hydrotalcites, and slip additives.

5. A flame retardant consisting of the composition according to claim 1.

6. A flame-retardant resin composition comprising 10 to 400 parts by mass of the flame retardant according to claim 5 with respect to 100 parts by mass of a resin.

7. A shaped article of the flame-retardant resin composition according to claim 6.

8. A method for flame-proofing a resin, comprising mixing the resin and a composition including component (A), component (B), and component (C), wherein:
    component (A) is at least one melamine salt selected from the group consisting of melamine orthophosphate, melamine pyrophosphate, and melamine polyphosphate;
    component (B) is at least one piperazine salt selected from the group consisting of piperazine orthophosphate, piperazine pyrophosphate, and piperazine polyphosphate; and
    component (C) is cyanuric acid.

9. The composition according to claim 2, further comprising, with respect to 100 parts by mass in total of the component (A) and the component (B), 0.01 to 10 parts by mass of component (D) which is zinc oxide.

10. The composition according to claim 2, wherein:
    the composition is a composition for resin; and
    the composition further comprises, with respect to 100 parts by mass in total of the component (A) and the component (B), 0.01 to 5 parts by mass of component (E) which is at least one component selected from the group consisting of silicone oils, epoxy-based coupling agents, hydrotalcites, and slip additives.

11. The composition according to claim 3, wherein:
    the composition is a composition for resin; and
    the composition further comprises, with respect to 100 parts by mass in total of the component (A) and the component (B), 0.01 to 5 parts by mass of component (E) which is at least one component selected from the group consisting of silicone oils, epoxy-based coupling agents, hydrotalcites, and slip additives.

12. The composition according to claim 9, wherein:
the composition is a composition for resin; and
the composition further comprises, with respect to 100 parts by mass in total of the component (A) and the component (B), 0.01 to 5 parts by mass of component (E) which is at least one component selected from the group consisting of silicone oils, epoxy-based coupling agents, hydrotalcites, and slip additives.

13. A flame retardant consisting of the composition according to claim 2.

14. A flame retardant consisting of the composition according to claim 3.

15. A flame retardant consisting of the composition according to claim 4.

16. A flame retardant consisting of the composition according to claim 9.

17. A flame retardant consisting of the composition according to claim 10.

18. A flame retardant consisting of the composition according to claim 11.

19. A flame retardant consisting of the composition according to claim 12.

* * * * *